(12) United States Patent
McDonald et al.

(10) Patent No.: US 8,874,136 B2
(45) Date of Patent: Oct. 28, 2014

(54) METHOD AND DEVICE FOR AUTOMATICALLY ACTIVATING AND DE-ACTIVATING ADJACENT RADIO SITES

(71) Applicant: Motorola Solutions, Inc., Schaumburg, IL (US)

(72) Inventors: Daniel J. McDonald, Cary, IL (US); George R. Economy, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 64 days.

(21) Appl. No.: 13/749,946

(22) Filed: Jan. 25, 2013

(65) Prior Publication Data

US 2014/0213232 A1 Jul. 31, 2014

(51) Int. Cl.
*H04W 24/00* (2009.01)
*H04W 52/02* (2009.01)

(52) U.S. Cl.
CPC ................................ *H04W 52/0206* (2013.01)
USPC .................. 455/456.1; 455/456.3; 455/456.5; 455/436; 455/440; 455/441; 455/443

(58) Field of Classification Search
CPC ....... H04W 84/08; H04W 48/12; H04W 4/10; H04W 76/005
USPC ............. 455/456.1, 456.3, 456.5, 418, 404.2, 455/436, 440, 441, 443, 574, 522
See application file for complete search history.

(56) References Cited

U.S. PATENT DOCUMENTS

| 5,123,110 | A | 6/1992 | Grube |
| 5,689,801 | A | 11/1997 | Frichtel et al. |
| 7,840,219 | B2 | 11/2010 | Ludovico et al. |
| 2003/0058824 | A1 | 3/2003 | Petterson et al. |
| 2005/0113129 | A1* | 5/2005 | Robinson ........................ 455/524 |
| 2009/0280854 | A1* | 11/2009 | Khan et al. .................... 455/522 |
| 2011/0105104 | A9 | 5/2011 | Petterson et al. |
| 2012/0039201 | A1* | 2/2012 | Roy et al. ....................... 370/252 |

FOREIGN PATENT DOCUMENTS

EP 1215930 B1 4/2005

* cited by examiner

*Primary Examiner* — Barry Taylor
(74) *Attorney, Agent, or Firm* — Daniel R. Bestor (57) ABSTRACT

A radio site controller is configured to dynamically activate adjacent radio sites by first identifying, based at least on a current location of a subscriber unit in a currently activated first radio site, a currently de-activated second radio site located adjacent to the first radio site, and subsequent activating the identified second radio site. The identified second radio site may be a single de-activated adjacent second radio site, all de-activated adjacent second radio sites, or a subset of de-activated adjacent second radio sites based on a subscriber unit travel direction determination.

20 Claims, 4 Drawing Sheets

METHOD AND DEVICE FOR AUTOMATICALLY ACTIVATING AND DE-ACTIVATING ADJACENT RADIO SITES

FIELD OF THE DISCLOSURE

The present disclosure relates to digital radio communication systems, in general, and to automatic activation and de-activation of adjacent radio site(s), in particular.

BACKGROUND OF THE DISCLOSURE

Radio access networks (RANs) provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, eNodeB, repeater, and/or access point. Such a RAN typically includes a system infrastructure which generally includes a network of various fixed terminals, which are in direct radio communication with the subscriber units. Each of the fixed terminals operating in the RAN may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the RAN are made via respective serving fixed terminals. Sites of neighbouring fixed terminals may be offset from one another or may be non-overlapping or partially or fully overlapping.

RANs may operate according to an industry standard protocol such as, for example, the Project 25 (P25) standard defined by the Association of Public Safety Communications Officials International (APCO), or other radio protocols, such as the terrestrial trunked radio (TETRA) standard defined by the European Telecommunication Standards Institute (ETSI) or the Digital Mobile Radio (DMR) standard also defined by the ETSI. Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in RANs such as those set forth above send user communicated speech and data, herein referred to collectively as 'traffic information', in accordance with the designated protocol.

Many so-called 'public safety' RANs provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force group. Many of these 'public safety' RANs have been deployed in dense urban and suburban areas.

Same or similar wireless communication systems may be used in more remote areas of the country, such as rural areas, where events occur less often, where a large number of sites provide service over a large geography containing few users, where fewer resources are generally available, and where operating costs may be a larger concern given the reduced number of occurrences for which each wireless communication system is needed. For example, many current trunked systems require a radio site to continuously be "on" such that a fixed terminal in the trunked site is continuously on the air and a control channel is continuously being transmitted. This allows radios that are within the proximity of the trunked site to be able to identify the trunked site, switch to the trunked site when needed, and receive and transmit control information, including, for example, new call requests, over the control channel of the trunked site. Furthermore, and for example, some current conventional systems require a radio site to be periodically or intermittently "on" such that a fixed terminal in the conventional site is periodically or intermittently on the air and a beacon is being transmitted. This allows radios that are within the proximity of the conventional site to be able to identify the conventional site, switch to the conventional site when needed, and receive and transmit control information, including new call requests, over the conventional channel.

However, a significant drawback of continuous, periodic, or intermittent required broadcasts is that it may cause unnecessary power consumption (which may be costly) when the radio site is not currently being used. This problem may be exaggerated in lower density regions where incidents occur with less frequency. However, such radio systems may be used in emergencies, and so still must be highly available. Accordingly, what is needed is an improved method for conserving resources in lower density regions while still providing for the high performance and high availability required of emergency response radio systems.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

As set forth above, there is a need for an improved method for conserving resources in lower density regions while still providing for the high performance and high availability required of emergency response radio systems.

According to a first embodiment of the present disclosure, a method of dynamically activating an adjacent radio site includes identifying, based at least on a current location of a subscriber unit in a currently activated first radio site, at least one currently de-activated second radio site located adjacent the first radio site, and activating at least one identified second radio site.

According to a second embodiment of the present disclosure, a radio site controller includes a memory, a transceiver, and a processor configured to: receive, via the transceiver, location information indicative of a current location of a subscriber unit in a currently activated first radio site, identify, based at least on the location information, at least one currently de-activated second radio site located adjacent the first radio site, and activate, via the transceiver, at least one identified second radio site.

Each of the above-mentioned embodiments will be discussed in more detail below, starting with example network and device architectures of the system in which the embodiments may be practiced, followed by a discussion of dynamic activation and de-activation of adjacent radio sites from a system perspective and from the point of view of the radio controller. Further advantages and features consistent with this disclosure will be set forth in the following detailed description, with reference to the figures.

I. Network and Device Architectures

Figure 1:
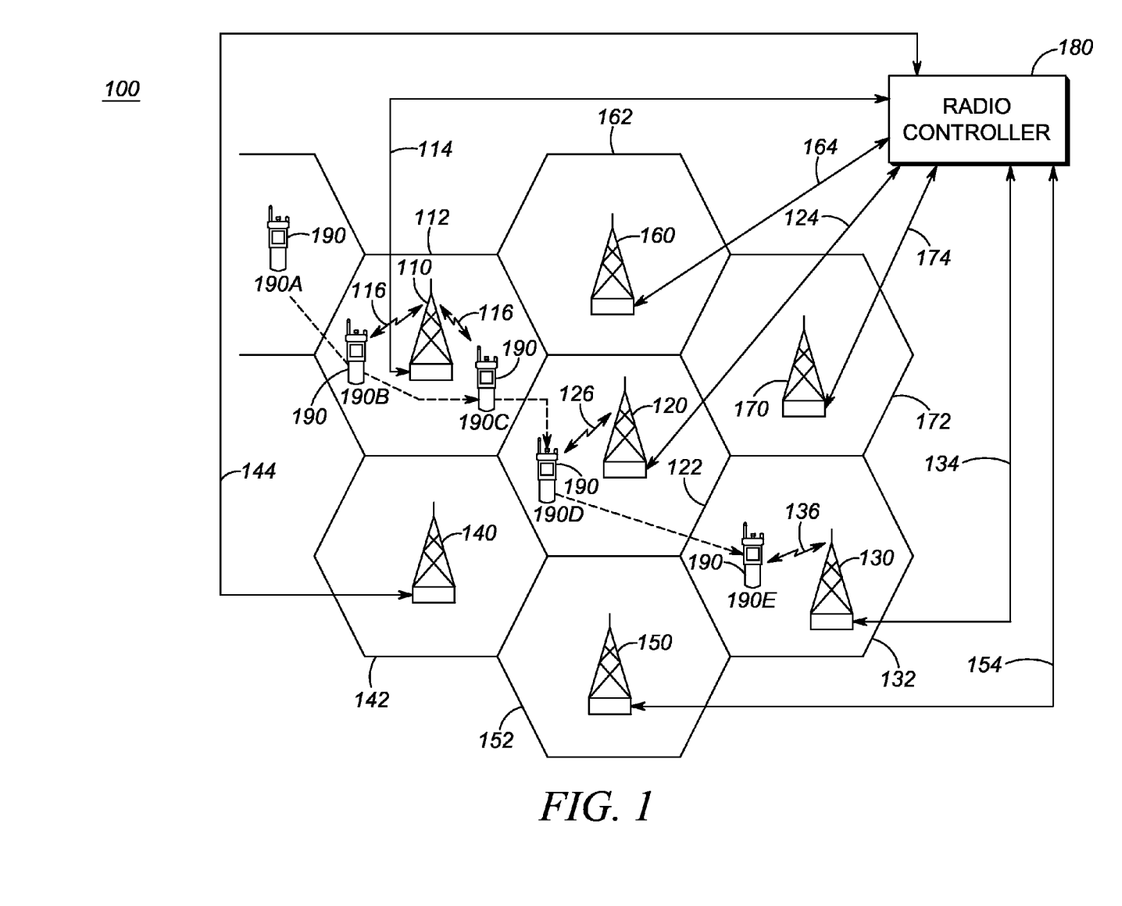
FIG. 1 is a schematic illustration of a radio communication system operating in accordance with an embodiment.

Referring to FIG. 1, one embodiment of a wireless communication system 100 according to the present disclosure is shown.

It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 includes one or more fixed terminals (e.g., base stations/eNodeBs/repeaters/control terminals) (BSs) 110, 120, 130, 140, 150, 160, 170, each having a corresponding radio site (e.g., coverage area) 112, 122, 132, 142, 152, 162, 172 over which wireless communication services are respectively provided, and each of which may be operably connected to a system infrastructure including a radio controller 180 via respective wired or wireless links 114, 124, 134, 144, 154, 164, 174. While the term BS will be used to refer to the fixed terminals, for ease of reference, it should be noted that the fixed terminals may, in some embodiments, be a repeater, an eNodeB, or a control terminal, or some other type of fixed terminal. Each BS 110, 120, 130, 140, 150, 160, 170 may have radio links with a plurality of subscriber units, particularly subscriber units (SUs) in the radio site. The term "adjacent" is meant to convey, in a preferred embodiment, a direct neighbour (or overlapping neighbor) of another radio site (such that, e.g., radio sites 122, 142, and 162 are directly adjacent radio site 112), but, in other embodiments, may also convey nearby radio sites that may or may not be a direct neighbour of another radio site (e.g., such that, e.g., radio sites 122, 132, 142, 152, 162, 172 are all adjacent, or nearby, radio site 112).

The radio controller 180 may be or include, for example, a zone controller, and may provide a signalling path between BSs and act to manage resources (such as conventional, control, and/or traffic channels) at the BSs. The radio controller 180 may also function to activate or de-activate each BS on a dynamic basis responsive to a determination of whether resources are currently, or will likely be, needed by SUs roaming near or into a corresponding respective radio site. Additionally, the radio controller 180 may include, or be configured to separately interface with, a Packet Data Gateway (PDG) for routing data such as location data to the zone controller. While the radio controller 180 is illustrated in FIG. 1 as a separate logical entity, in other embodiments, the functionality described herein could be integrated into a BS or other logical entity at a radio site, or distributed across a plurality of radio sites, in which case the radio controller 180 entity illustrated in FIG. 1 would be replaced by a local area network (LAN) or wide area network (WAN). The radio controller 180 may provide other functions to the BSs and/or SUs as well.

Each of the BSs 110, 120, 130, 140, 150, 160, 170 and corresponding radio site 112, 122, 132, 142, 152, 162, 172 may operate as a conventional radio site or a trunked radio site. In a conventional radio system, a plurality of SUs are formed into groups. Each group uses an associated channel (shared or separate) for communication. Thus, each group is associated with a corresponding channel, and each channel can only be used by one group at any particular moment in time. Channels may be divided by frequency, time, and/or code. In some systems, multiple groups may operate on the same channel, and may use a unique group ID embedded in the group communications to differentiate them. In a trunked radio system, SUs use a pool of channels for virtually an unlimited number of groups. Thus, all groups are served by all channels. For example, in a trunking system, all SUs operating at a radio site idle on a designated control channel or rest channel and when a new call is requested over the control or rest channel, is assigned a new traffic channel for the new group call while remaining SUs not participating in the new group call stay on the designated control channel or rest channel. Other conventional and trunked configurations are possible as well.

A single SU 190 is illustrated in FIG. 1 as operating within the wireless communication system 100. While only one SU 190 is shown, for ease of illustration and description, in other embodiments, a plurality of SUs may be active in any one or more radio sites.

In one example, each BS, such as BS 110, serves SUs within its service area, such as SU 190 at location 190B or 190C, with radio communications to and from other terminals, the other terminals including (i) SUs served by the same BS (e.g., BS 110), (ii) SUs (not shown) served by other BSs (e.g., BSs 120, 130, 140, 150, 160, 170), and (iii) other terminals including SUs in other systems (not shown) operably linked to the system 100 via the system infrastructure.

A system infrastructure supporting each BS, in addition to radio controller 180, may include known sub-systems (not shown) required for operation of the system 100. Such sub-systems may include, for example, sub-systems providing authentication, routing, SU registration and location, system management and other operational functions within the system 100, some of which may be provided by radio controller 180. The system infrastructure may additionally provide routes to other BSs (not shown) providing radio sites serving other SUs, and/or may provide access to other types of networks such as a plain old telephone system (POTS) network or a data-switched network such as the Internet (not shown).

Figure 2:
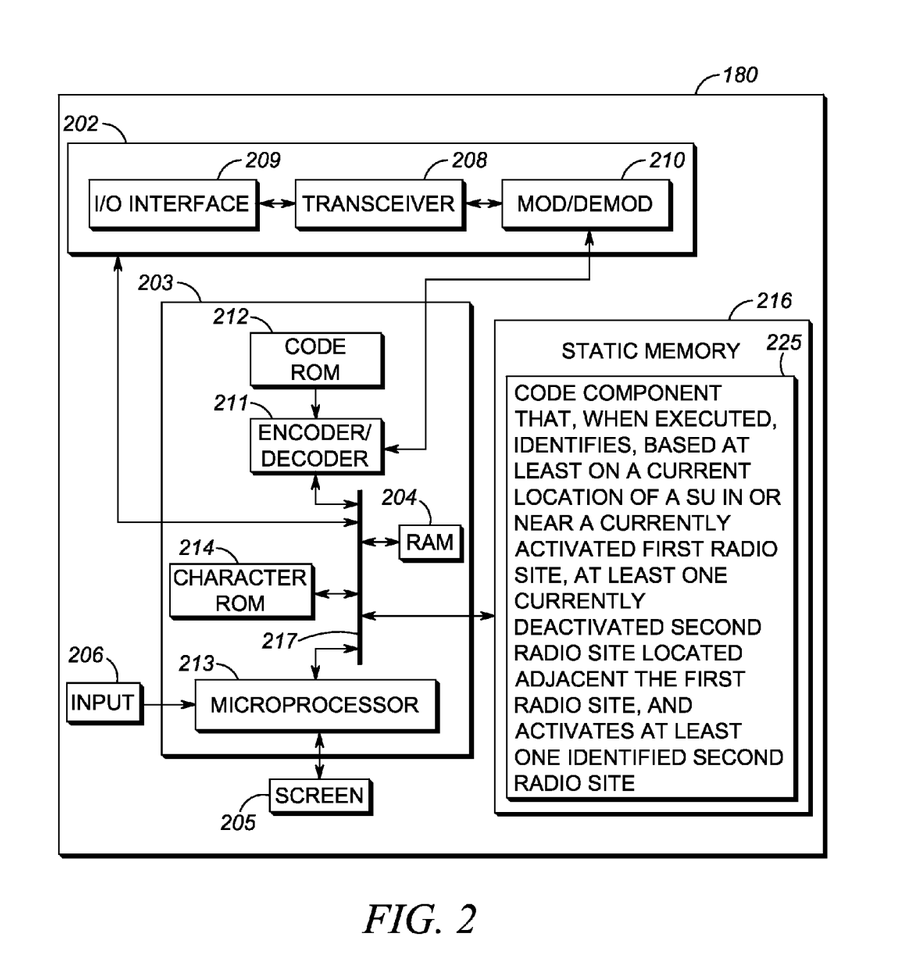
FIG. 2 is a block diagram of a radio controller computing device capable of operating in the communication system of FIG. 1 in accordance with an embodiment.

For the purpose of illustrating methods and devices for dynamically activating and de-activating adjacent radio sites, FIG. 1 illustrates a movement of SU 190 from an initial location 190A adjacent to radio site 112 to a second location 190B within radio site 112, then to a third location 190C still within radio site 112 but towards adjacent radio site 122, then to a fourth location 190D within adjacent radio site 122, and finally to a fifth location 190E within adjacent radio site 132. At initial location 190A, it is assumed that radio site 112 has been activated, but that SU 190 is not yet in communication with, or registered with, BS 110 in radio site 112. Furthermore, it is assumed that none of the other radio sites 122, 132, 142, 152, 162, 172 are currently activated (e.g., they are de-activated and conserving power by not broadcasting a continuous, periodic, or intermittent trunked control channel or conventional channel beacon). FIG. 2 will next illustrate a functional block diagram of a structure of the radio controller 180, after which FIG. 3 will illustrate a message flow diagram showing messaging flows between the SU 190, BSs 110, 120, 130, 140, 150, 160, 170, and radio controller 180, as the SU 190 moves from location 190A to location 190E and as adjacent BSs are activated and de-activated.

FIG. 2 is an example functional block diagram of a radio controller such as radio controller 180 operating within the system 100 of FIG. 1 in accordance with some embodiments. As shown in FIG. 2, radio controller 180 includes a communications unit 202 coupled to a common data and address bus 217 of a processing unit 203. The radio controller 180 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals that may be transmitted or received between other BSs or SUs in the system 100, or perhaps between other radio controllers in a remote radio communication system directly or indirectly (e.g., via a WAN such as the Internet) coupled to the radio controller 180. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with SUs such as SU 109, with BSs such as BSs 110, 120, 130, 140, 150, 160, 170, and/or with other system infrastructure devices (not shown). The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding and/or encoding data such as location and/or bearing information, activation or de-activation messages, other control signalling, and/or data or voice messages that may be transmitted or received by the radio controller 180. Static memory 216 may store operating code for the microprocessor 213 that, when executed, identifies, based at least on a current location of a SU in a currently activated first radio site, at least one currently de-activated second radio site located adjacent the first radio site, and activates at least one identified second radio site, in accordance with one or more of FIGS. 3-4 and corresponding text. Static memory 216 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

II. Dynamic Activation and De-Activation of Adjacent Radio Site Process Flows FIGS. 3 and 4 set forth example message and processing flows for dynamic activation and de-activation of adjacent radio sites in accordance with some embodiments. In the examples set forth in detail below, only particular sequences are disclosed with respect to the SU and the radio controller. Of course, additional steps not disclosed herein could be additionally added before, after, or in-between steps or messages disclosed in FIGS. 3 and 4, and the presence of such additional steps would not negate the purpose and advantages of the examples set forth in detail throughout the remainder of this disclosure. Steps drawn with a dashed outline in FIGS. 3 and 4 should be understood to be optional steps. Further details regarding the process flows will be first set forth with regard to the message flow diagram of FIG. 3, and then the process flow diagram of FIG. 4, below.

Figure 3:
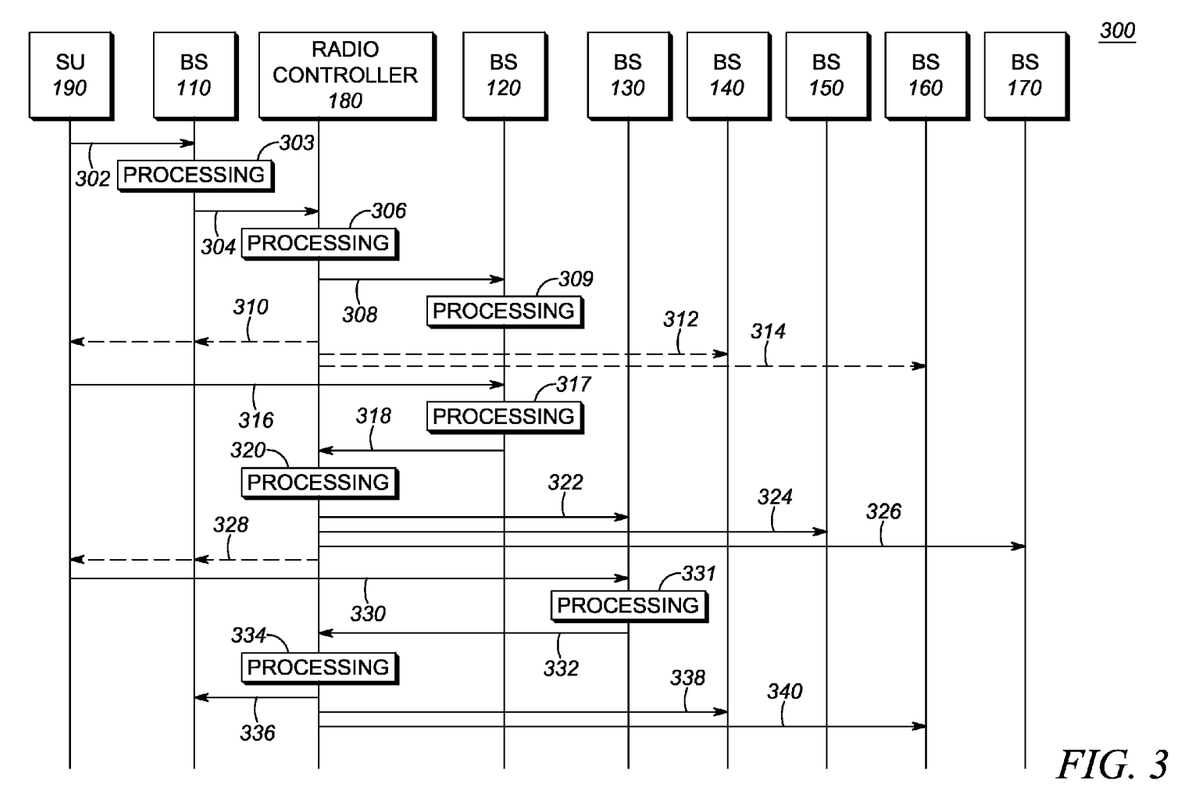
FIG. 3 is a ladder diagram illustrating an example message flow for dynamically activating and de-activating adjacent radio sites in accordance with an embodiment.

FIG. 3 sets forth a message flow diagram 300 that illustrates one example of messages that may flow between the SU 190, BSs 110, 120, 130, 140, 150, 160, 170, and radio controller 180, as the SU 190 moves from location 190A to location 190E and as adjacent BSs are activated and de-activated.

Initially, BS 110 is in an activated state, perhaps due to the SU's 190 movement to a radio site (not shown) adjacent to radio site 112. As a result, BS 110 may be actively broadcasting a continuous, periodic, or intermittent control channel (for a trunked system) or may be actively broadcasting a periodic or intermittent conventional channel beacon (for a conventional system). In any event, BS 110 is active and is consuming power broadcasting a signal so that SU 190 can locate it when it moves near (but not into) or into radio site 112. SU 190 may be pre-configured with the frequency of the control channel or conventional channel at radio site 112, may be configured to scan a pre-configured set of frequencies to find the control channel or conventional channel at radio site 112, or may be informed by some other BS or infrastructure device at its location 190A of the frequency of the control channel or conventional channel at radio site 112, among other possibilities.

In any event, as the SU 190 moves from location 190A to location 190B, it is able to locate the control or conventional channel being broadcast at BS 110 and establish a connection with BS 110 over radio link 116, perhaps handing off service from a prior BS being used at location 190A. Establishing a connection with BS 110 may be accomplished in any number of ways consistent with the protocol being used by the SU 190 and the BS 110, which may be consistent with one or more of the DMR, APCO P25, or TETRA standard protocols. A Message 302 illustrated in FIG. 3 as being transmitted from SU 190 to BS 110 may be any message indicative of an intent of SU 190 to receive communications services from BS 110

(and thus also indicative of its location in radio site 112) and may include, for example, a registration request message, a hand-off request message, a bearing information message, an authentication response message, a location information message (perhaps including a self-calculated GPS location of SU 190), or some other message wirelessly received from SU 190. At step 303, the BS 110 receives the message 302 and processes the message. Processing the message at step 303 may include one or more of determining if SU 190 has permission to receive communications services from BS 110 (including perhaps accessing a home or visitor location register), authenticating SU 190, and/or some other function. Also at step 303, and assuming that the SU successfully registers with BS 110, the BS 110 notifies radio controller 180 of the SU's 190 registration with BS 110 and its location in radio site 112 via message 304. In another embodiment, the message 304 may be transmitted to radio controller 180 as part of the registration process, and may serve as notification of the SU's presence without requiring a separate message to be sent between the BS 110 and the radio controller 180.

At step 306, the radio controller 180 processes the message 304, and determines whether any radio sites need to be activated or de-activated in view of SU's 190 presence at location 190B in radio site 112. The granularity of location information available to radio controller 180 may vary from radio site only (e.g., SU 190 is somewhere in radio site 112) to a specific geographic location (perhaps a GPS location calculated by SU 190 or BS 110 and provided to radio controller 180 in message 304, or via some other messaging).

In one example, and although not illustrated in FIG. 3, the SU 190 may further move from location 190B within radio site 112 to location 190C still within radio site 112. Updated locations of the SU 190 may be provided periodically or intermittently to BS 110 and/or radio controller 180, at the SU's 190 own initiative, or in response to periodic or intermittent requests from the BS 110 and/or the radio controller 180.

Based at least on the broad information that SU 190 has moved to some location in radio site 112 (e.g., location 190B or 190C in FIG. 1), the radio controller 180 can determine that it is possible or likely that SU 190 will continue moving, and may enter into any other radio site adjacent to radio site 112. Accordingly, and responsive to receiving the message 304, at step 306, the radio controller 180 identifies one or more adjacent radio sites, relative to radio site 112, that should be activated to ensure wireless communications services continue to be available for SU 190 as it roams out of radio site 112.

Radio controller 180 may maintain a mapping of adjacent radio sites and of their activation status in order to aid it in determining which adjacent radio sites need to be activated and/or de-activated at step 306. For example, the radio controller 180 may access and maintain an adjacent radio site mapping as set forth in Table I. Of course, other methods of storing and maintaining adjacent site information could be implemented at the radio controller 180 in accordance with other embodiments.

TABLE I

Example Adjacent Radio Site Map

| Radio Site ID | Adjacent Radio Sites | Activation Status |
|---|---|---|
| 112 | 122, 142, 162 | Activated |
| 122 | 112, 132, 142, 152, 162, 172 | De-Activated |
| 132 | 122, 152, 172 | De-Activated |
| 142 | 112, 122, 152 | De-Activated |
| 152 | 122, 132, 142 | De-Activated |
| 162 | 112, 122, 172 | De-Activated |
| 172 | 122, 132, 162 | De-Activated |

Table I is illustrated above in a state prior to, or just as, SU 190 enters radio site 112. As stated earlier, and as reflected in Table I, radio site 112 is initially in an active state due to SU's 190 presence in an area adjacent to radio site 112. The remaining radio sites are initially in a de-activated state (assuming no other SU's are presently active in radio sites 122, 132, 142, 152, 162, or 172). In identifying one or more adjacent radio sites at step 306, radio controller 180 may thus reference the entry in Table I for radio site 112, and determine that the adjacent radio sites for radio site 112 include radio sites 122, 142, and 162. Radio controller 180 may then use Table I again to determine the current status of radio sites 122, 142, and 162, which, as shown in Table I above, are currently in a de-activated state.

In one embodiment, radio controller 180 may determine if additional information is available that would allow it to deduce a subset of the adjacent radio sites 122, 142, and 162 to activate as radio sites in which the SU 190 is more likely to roam into than the others, so that only a subset of all adjacent de-activated radio sites need to be activated. The additional information may be bearing information indicative of a direction of travel of SU 190. Bearing information may be provided directly to radio controller 180 by SU 190, and may include location, direction, speed, and/or acceleration information perhaps determined via a GPS unit or application at SU 190 and/or one or more motion or direction sensors at SU 190. Alternatively, bearing information may be calculated at BS 110 or radio controller 180 based on a plurality of SU 190 location data points provided by the SU 190 itself and/or the BS 110. Based on a plurality of location points and associated time stamps indicative of a general time at which the respective location point was determined or measured, the radio controller 180 can itself deduce a direction of travel (perhaps including speed and/or acceleration as well) of the SU 190.

In one example, and as illustrated in FIG. 3, the radio controller may be provided with bearing information sufficient to establish SU's 190 travel through locations 190B and 190C and that SU 190 will most likely enter adjacent radio site 122 next (and not adjacent radio sites 142 or 162). Responsive to this determination, and responsive to determining, via Table I above that radio site 122 is currently in a de-activated status, radio controller 180 transmits an activation message 308 to BS 120. At step 309, BS 120 transitions from a de-activated state to an activated state, and subsequently begins transmitting one or more of a continuous, periodic, or intermittent control channel or conventional channel beacon on its assigned frequency. Thus, BS 120 and associated radio site 122, is activated prior to subscriber unit 190 entering (or perhaps even nearing) the radio site 122, allowing the subscriber unit 190 to detect the availability of radio site 122 (or other activated adjacent radio sites) as it moves toward the respective radio site.

Radio controller 180 may also edit Table I after transmitting the activation message 308 to indicate BS's 120 (and thus radio site 122's) activated status. In another embodiment, radio controller 180 may wait for confirmation from BS 120 that it has successfully transitioned from a de-activated state to an activated state before updating the Table I mapping maintained at the radio controller 180. Radio controller 180 may additionally, with or without confirmation of successful transition from BS 120, transmit a message 310 notifying SU 190 of the availability of newly activated BS 120 and associated radio site 122. The message 310 may include an identifier associated with BS 120, perhaps along with a frequency on which a control channel or conventional channel beacon can be located for BS 120.

In another embodiment in which a bearing of SU 190 cannot be determined, and the information available to radio controller 180 merely indicates SU's 190 presence somewhere in radio site 112, radio controller 180 may determine which radio sites, of all known radio sites adjacent to radio site 112, are currently in a de-activated state (perhaps via the Table I mapping noted above), and transmit an activation message to each currently de-activated adjacent radio site. For example, given the state of the radio sites indicated in Table I above, as SU 190 moves in radio site 112 and radio controller receives message 304, radio controller may determine that all three radio sites 122, 142, and 162 adjacent to radio site 112 should be activated, and in addition to activation message 308, transmit additional activation messages 312 and 314 to BSs 140 and 160, respectively. A message similar to message 310 may be provided to SU 190 after activation, but may include information relative to all three radio sites 122, 142, and 162. After activating radio sites 122, 142, and 162, Table I may be updated in the following manner as set forth in Table II:

TABLE II

Second Example Adjacent Radio Site Map

| Radio Site ID | Adjacent Radio Sites | Activation Status |
|---|---|---|
| 112 | 122, 142, 162 | Activated |
| 122 | 112, 132, 142, 152, 162, 172 | Activated |
| 132 | 122, 152, 172 | De-Activated |
| 142 | 112, 122, 152 | Activated |
| 152 | 122, 132, 142 | De-Activated |
| 162 | 112, 122, 172 | Activated |
| 172 | 122, 132, 162 | De-Activated |

In light of the foregoing, and as the SU 190 moves from location 190B or 190C to location 190D, it is able to locate the control or conventional channel being broadcast at BS 120 and establish a connection with BS 120 over radio link 126, perhaps handing off service from the prior BS 110 being used at location 190B or 190C. SU 190 then transmits a message 316 to BS 120 over radio link 126. Similar to message 302, the message 316 may be any message indicative of an intent of SU 190 to receive communications services from BS 120 (and thus also indicative of its location in radio site 122)

At step 317, the BS 120 receives the message 316 and processes the message in a same or similar manner to that of step 303. Also at step 317, the BS 120 notifies radio controller 180 of the SU's 190 registration with BS 120 and its location in radio site 122 via message 318.

At step 320, the radio controller 180 processes the message 318, and determines whether any radio sites need to be activated or de-activated in view of SU's 190 presence at location 190D in radio site 122.

Based at least on the broad information that SU 190 has moved to some location in radio site 112 (e.g., location 190D), the radio controller can determine that it is possible or likely that SU 190 will continue moving, and may enter into any other radio site adjacent to radio site 122. Accordingly, and responsive to receiving the message 318, at step 320, the radio controller 180 identifies one or more adjacent de-activated radio sites, relative to radio site 122, that should be activated to ensure wireless communications services continue to be available for SU 190 as it roams out of radio site 122.

Assuming that Table II illustrates the current state of the radio site mapping at radio controller 180 when it receives the message 318, radio controller 180 references the Table II using radio site 122, and determines that radio sites 112, 132, 142, 152, 162, and 172 are all adjacent to radio site 122, and that radio sites 112, 122, 142, and 162 are already in an active state.

In one embodiment, radio controller 180 may determine if additional information is available that would allow it to deduce a subset of the adjacent de-activated radio sites 132, 152, and 172 to activate as radio sites in which the SU 190 is more likely to roam into than the others, so that only a subset of all adjacent de-activated radio sites need to be activated, in a manner similar to that already set forth above.

Assuming that such additional information is not currently available while the SU 190 is in radio site 122, radio controller 180 may determine which radio sites, of all known radio sites adjacent to radio site 112, are currently in a de-activated state (perhaps via the Table II mapping noted above), and transmit an activation message to each currently de-activated adjacent radio site. For example, given the state of the radio sites indicated in Table II above, as SU 190 moves into radio site 122 and radio controller receives message 318, radio controller may determine that all six radio sites 112, 132, 142, 152, 162, and 172 adjacent radio site 122 should be activated, of which radio sites 112, 142, and 162 are already activated. Accordingly, the radio controller may transmit activation messages 322, 324, and 326 to BSs 130, 150, and 170, respectively, as shown in FIG. 3. After activating radio sites 132, 152, and 172 (and with or without waiting for confirmation from the BSs of a successful transition to active status), Table II may be updated in the following manner as set forth in Table III:

TABLE III

Third Example Adjacent Radio Site Map

| Radio Site ID | Adjacent Radio Sites | Activation Status |
|---|---|---|
| 112 | 122, 142, 162 | Activated |
| 122 | 112, 132, 142, 152, 162, 172 | Activated |
| 132 | 122, 152, 172 | Activated |
| 142 | 112, 122, 152 | Activated |
| 152 | 122, 132, 142 | Activated |
| 162 | 112, 122, 172 | Activated |
| 172 | 122, 132, 162 | Activated |

Radio controller 180 may optionally, with or without confirmation of successful transition from BSs 130, 150, and, or 170, transmit a message 328 notifying SU 190 of the availability of newly activated BSs 130, 150, and 170 and associated radio sites 132, 152, and 172 (perhaps additionally including previously activated BSs 110, 140, and 160 and associated radio sites 112, 142, and 162). The message 328 may include an identifier associated with each BS, perhaps along with a frequency on which a control channel or conventional channel beacon can be located for each BS.

In light of the foregoing, and as the SU 190 moves from location 190D to location 190E, it is able to locate the control or conventional channel being broadcast at BS 130 and establish a connection with BS 130 over radio link 136, perhaps handing off service from the prior BS 120 being used at location 190D. SU 190 then transmits a message 330 to BS 130 over radio link 136. Similar to messages 302 and 316, the message 330 may be any message indicative of an intent of SU 190 to receive communications services from BS 130 (and thus also indicative of its location in radio site 132).

At step 331, the BS 130 receives the message 330 and processes the message in a same or similar manner to that of steps 306 and/or 317. Also at step 331, the BS 130 notifies radio controller 180 of the SU's 190 registration with BS 130 and its location in radio site 132 via message 332.

At step 334, the radio controller 180 processes the message 332, and determines whether any radio sites need to be activated or de-activated in view of SU's 190 presence at location 190E in radio site 132.

Based at least on the broad information that SU 190 has moved to some location within radio site 132 (e.g., location 190E), the radio controller may determine that SU 190 is no longer in a radio site adjacent to previously activated radio sites 112, 142, and 162. In this example, responsive to receiving the message 332, at step 334, the radio controller 180 may identify one or more previously adjacent radio sites, relative to prior radio site 122, that are no longer adjacent to current radio site 132 and should be de-activated to conserve power and resources in those radio sites.

Assuming that Table III illustrates the current state of the mapping at radio controller 180 when it receives the message 332, radio controller 180 references the Table III using current radio site 132, and determines that activated radio sites 112, 142, and 162 are no longer adjacent radio sites to the SU's 190 current radio site (132).

In one embodiment, radio controller 180 may determine if additional information is available that would allow it to further de-activate adjacent radio sites 122, 152, or 172, in addition to radio sites 112, 142, and 162. For example, if the radio controller can determine that SU 190 is heading towards radio site 152 and away from radio site 172, it may be able to also de-activate radio site 172 (until such time as SU 190 enters a new radio site, or radio controller 190 determines that SU 190 has changed direction and is heading back towards radio site 172). Radio controller 180 may thus continuously or periodically track the trajectory of SU 190 in order to determine whether any activated adjacent radio sites can safely be de-activated, and whether any de-activated adjacent radio sites need to be re-activated because of a detected change in trajectory.

Assuming that such additional information is not currently available while the SU 190 is in radio site 132, radio controller 180 may determine that radio sites 112, 142, and 162 should be de-activated, and transmit de-activation messages to each currently activated previously adjacent radio site 112, 142, 162. Accordingly, the radio controller may transmit de-activation messages 336, 338, and 340 to BSs 110, 140, and 160, respectively. After de-activating radio sites 112, 142, and 162 (and with or without waiting for confirmation from the BSs of a successful transition to de-active status), Table III may be updated in the following manner as set forth in Table IV:

TABLE IV

Fourth Example Adjacent Radio Site Map

| Radio Site ID | Adjacent Radio Sites | Activation Status |
|---|---|---|
| 112 | 122, 142, 162 | De-Activated |
| 122 | 112, 132, 142, 152, 162, 172 | Activated |
| 132 | 122, 152, 172 | Activated |
| 142 | 112, 122, 152 | De-Activated |
| 152 | 122, 132, 142 | Activated |
| 162 | 112, 122, 172 | De-Activated |
| 172 | 122, 132, 162 | Activated |

Figure 4:
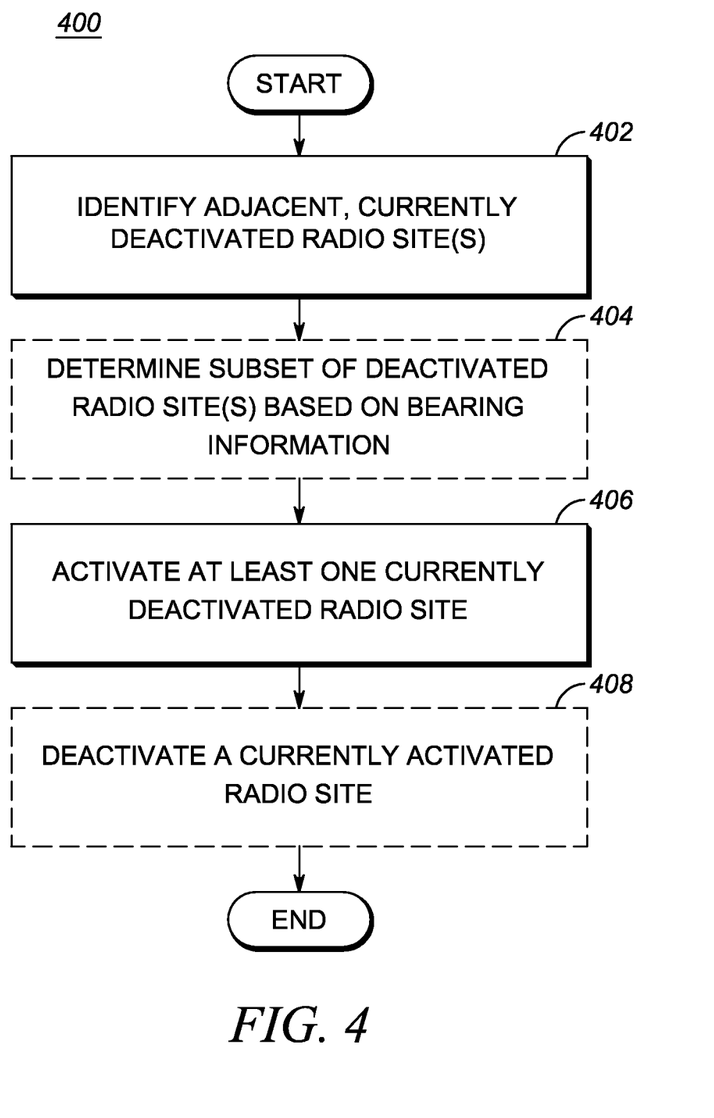
FIG. 4 is a flow chart illustrating a method of dynamically activating and de-activating adjacent radio sites from the perspective of a radio controller in accordance with an embodiment.

FIG. 4 sets forth a method 400 executable at a radio controller, such as radio controller 180 of FIGS. 1 and 2, for dynamically activating and/or de-activating adjacent radio sites, in accordance with an embodiment. At step 402, the radio controller identifies an adjacent, currently de-activated radio site relative to a radio site near or in which a first subscriber unit is either currently operating or has newly arrived and requested or just established operation, perhaps consistent with any one or more of the messages or steps 302-306 of FIG. 3.

At step 404, the radio controller may optionally determine a subset of all adjacent de-activated radio sites that the first subscriber unit is more or most likely to enter, perhaps based on bearing information relative to the first subscriber unit, and perhaps consistent with processing step 306 of FIG. 3.

At step 406, the radio controller activates at least one currently de-activated adjacent radio site. For example, the radio controller could activate all currently de-activated adjacent radio sites, only one currently de-activated adjacent radio site (e.g., perhaps the one that the radio controller determines is the most likely to be entered based on a current bearing of the subscriber device), or some subset of all (but not all) of the currently de-activated adjacent radio sites (e.g., perhaps the one radio site that the radio controller determines is the most likely to be entered based on a current bearing of the subscriber device plus the radio sites that are adjacent to the one most likely radio site). Activating radio sites may include transmitting an activation request message to a BS in each currently de-activated radio site desiring to be activated, instructing the BS to exit a de-activated state and enter an activated state. In response to receiving the activation message, the receiving BS may begin transmitting one of a continuous, periodic, or intermittent control channel (in a trunked radio system) or one of a periodic or intermittent conventional channel beacon (in a conventional radio system), among other possibilities.

At optional step 408, the radio controller may also de-activate one or more currently activated radio sites that are no longer adjacent to the radio site near or in which the subscriber unit is currently or newly operating. For example, one or more radio sites that were adjacent to the radio site that the subscriber unit was previously operating in may be de-activated, among other additional radio sites. De-activating a radio site may include transmitting a de-activation request message to a BS in each currently activated radio site desiring to be de-activated, instructing the BS to exit an activated state and enter a de-activated state. In response to receiving the de-activation message, the receiving BS may stop transmitting one of a continuous, periodic, or intermittent control channel (in a trunked radio system) or one of a periodic or intermittent conventional channel beacon (in a conventional radio system), among other possibilities.

III. Conclusion

In accordance with the foregoing, a method and a radio controller device are disclosed that allows for dynamic activation and de-activation of adjacent radio sites based on subscriber unit movement and location, allowing radio sites having a continuous, periodic, or intermittent transmitted signal to be activated and de-activated as needed, saving power and resources in less dense areas, while still providing reliable emergency services on demand, when needed. As a result, a more power efficient, robust, and adaptable communications system can be provided across a varying geographic range, improving response times and communication capabilities of incidence response groups in less dense, perhaps rural areas. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terMS "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of selectively activating adjacent radio sites, the method comprising:
   identifying, by a radio controller and based at least on a current location of a subscriber unit in a currently activated first radio site, a plurality of second radio sites located adjacent the first radio site;
   accessing, by the radio controller, a site activation mapping that, for each second radio site adjacent the first radio site, identifies a current activation state of the second radio site;
   identifying, by the radio controller and as a function of the site activation mapping, a set of one or more second radios sites from the plurality of second radio sites that have a current activation state of de-activated;
   transmitting, by the radio controller, activation messages to only those second radio sites in the identified set, the activation message comprising an instruction to transition from a de-activated state to an activated state; and
   modifying, by the radio controller, the site activation mapping to indicate the current activation state of the second radio sites in the identified set as activated.

2. The method of claim 1, wherein the current location of the subscriber unit is determined via receipt of GPS location data from the subscriber unit.

3. The method of claim 1, wherein the current location of the subscriber unit is determined via the subscriber unit's current registration with the first radio site.

4. The method of claim 1, wherein a radio site in the set is a trunked radio site, and activating the radio site comprises causing a control channel to start to be transmitted at the radio site.

5. The method of claim 4, wherein the control channel is a continuous or periodic signal broadcast at the radio site and is dedicated for transmission and reception of control signaling, including the assignment of traffic channels for newly requested radio calls at the radio site.

6. The method of claim 1, wherein a radio site in the set is a conventional radio site, and activating the radio site comprises causing a conventional channel beacon to start to be transmitted at the radio site.

7. The method of claim 6, wherein the conventional channel beacon is a periodic or intermittent signal broadcast at the radio site and used for locating the radio site.

8. The method of claim 1, further comprising activating a radio site in the set prior to the subscriber unit entering the radio site.

9. The method of claim 1, further comprising informing the subscriber unit of the availability of a radio site in the set after activating the radio site.

10. The method of claim 1,
wherein the set of one or more second radio sites comprises at least two currently de-activated second radio sites.

11. The method of claim 1, the step of identifying the set of one or more second radio sites further comprising:
first identifying, by the radio controller and as a function of the site activation mapping, a first set of at least two currently de-activated second radio sites from the plurality of second radio sites that have a current activation state of de-activated;
determining, based at least on bearing information indicative of a direction of travel of the subscriber unit, a subset of the first set of currently de-activated second radio sites the subscriber device is most likely to enter; and
using the subset of the first set of currently de-activated second radio sites as the set of one or more second radios sites.

12. The method of claim 11, wherein the bearing information comprises one of:
geographic location points over a period of time sufficient to extrapolate a direction of travel of the subscriber unit; and
direction of travel information directly indicative of the direction of travel of the subscriber unit.

13. The method of claim 1, further comprising;
identifying, by the radio controller, one or more previously activated radio sites that are not adjacent to the at least one identified second radio site,
transmitting, by the radio controller, de-activation messages to the one or more previously activated radio sites; and
modifying, by the radio controller, the site activation mapping to indicate the current activation state of the one or more previously activated radio sites as de-activated.

14. A radio site controller comprising:
a memory;
a transceiver; and
a processor configured to:
receive, via the transceiver, location information indicative of a current location of a subscriber unit in a currently activated first radio site;
identify, based at least on the location information, a plurality of second radio sites located adjacent the first radio site;
access a site activation mapping that, for each second radio site adjacent the first radio site, identifies a current activation state of the second radio site;
identify, as a function of the site activation mapping, a set of one or more second radios sites from the plurality of second radio sites that have a current activation state of de-activated;
transmit, via the transceiver, activation messages to only those second radio sites in the identified set, the activation message comprising an instruction to transition from a de-activated state to an activated state; and
modify the site activation mapping to indicate the current activation state of the second radio sites in the identified set as activated.

15. The radio site controller of claim 14, wherein a radio site in the set is a trunked radio site, and activating the a radio site comprises causing a control channel to start to be transmitted at the radio site.

16. The radio site controller of claim 14, wherein a radio site in the set is a conventional radio site, and activating the radio site comprises causing a conventional channel beacon to start to be transmitted at the radio site.

17. The radio site controller of claim 14, wherein the processor is further configured to inform the subscriber unit, via the transceiver, of the availability of a radio site in the set after activating the radio site.

18. The radio site controller of claim 14, wherein the processor is further configured to:
identify one or more previously activated radio sites that are not adjacent to the at least one identified second radio site;
transmit, via the transceiver, de-activation messages to the one or more previously activated radio sites; and
modify the site activation mapping to indicate the current activation state of the one or more previously activated radio sites as de-activated.

19. The radio site controller of claim 14, wherein the processor is further configured to identify the set of one or more second radio sites by:
first identifying, as a function of the site activation mapping, a first set of at least two currently de-activated second radio sites from the plurality of second radio sites that have a current activation state of de-activated;
determining, based at least on bearing information indicative of a direction of travel of the subscriber unit, a subset of the first set of currently de-activated second radio sites the subscriber device is most likely to enter; and
using the subset of the first set of currently de-activated second radio sites as the set of one or more second radios sites.

20. The radio site controller of claim 14, wherein the bearing information comprises one of:
geographic location points over a period of time sufficient to extrapolate a direction of travel of the subscriber unit; and
direction of travel information directly indicative of the direction of travel of the subscriber unit.

* * * * *

UNITED STATES PATENT AND TRADEMARK OFFICE
CERTIFICATE OF CORRECTION

PATENT NO. : 8,874,136 B2  
APPLICATION NO. : 13/749946  
DATED : October 28, 2014  
INVENTOR(S) : Daniel J. McDonald et al.

Page 1 of 1

It is certified that error appears in the above-identified patent and that said Letters Patent is hereby corrected as shown below:

IN THE SPECIFICATION:

In Column 9, Line 55, delete "site 122)" and insert -- site 122). --, therefor.

IN THE CLAIMS:

In Claim 1, Column 14, Line 56, delete "radios sites" and insert -- radio sites --, therefor.

In Claim 11, Column 15, Lines 45-46, delete "radios sites." and insert -- radio sites. --, therefor.

In Claim 14, Column 16, Line 14, delete "radios sites" and insert -- radio sites --, therefor.

In Claim 15, Column 16, Line 25, delete "the a radio" and insert -- the radio --, therefor.

In Claim 19, Column 16, Line 56, delete "radios" and insert -- radio --, therefor.

Signed and Sealed this  
Seventeenth Day of May, 2016

Michelle K. Lee  
*Director of the United States Patent and Trademark Office*